J. H. GOSS & J. WEBER.
HOLDER FOR GLOBES OF LIGHTING APPARATUS.
APPLICATION FILED OCT. 12, 1910.
984,136.
Patented Feb. 14, 1911.
3 SHEETS—SHEET 1.
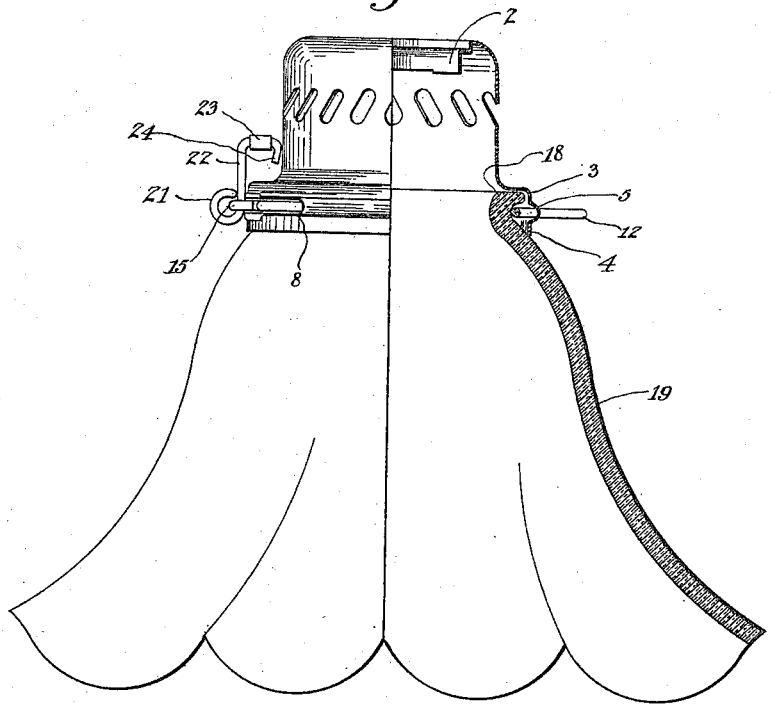
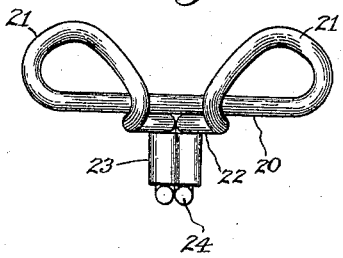
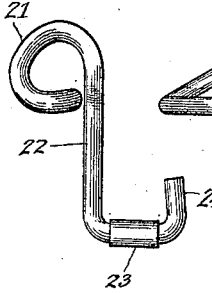
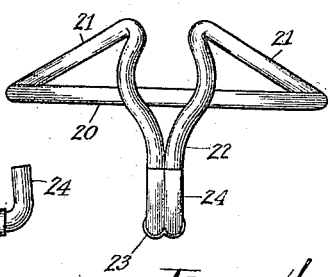

J. H. GOSS & J. WEBER.
HOLDER FOR GLOBES OF LIGHTING APPARATUS.
APPLICATION FILED OCT. 12, 1910.

984,136.

Patented Feb. 14, 1911.

3 SHEETS—SHEET 2.

Witnesses.

Inventors
John H. Goss
John Weber

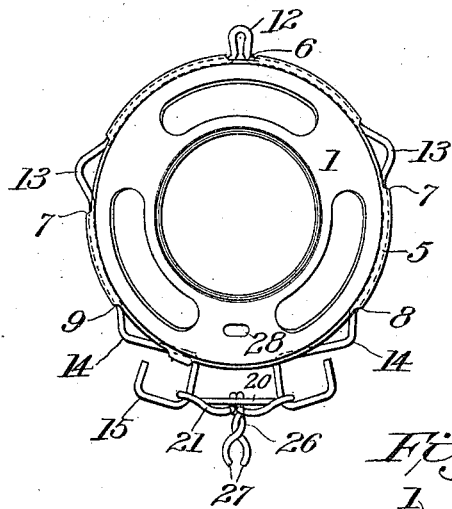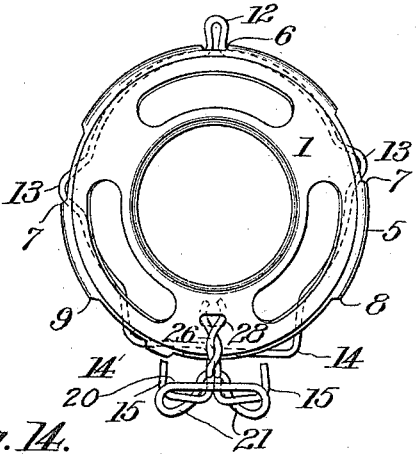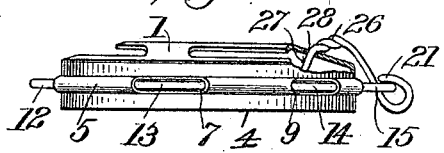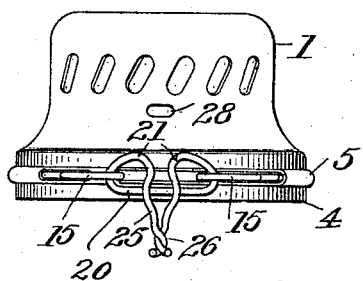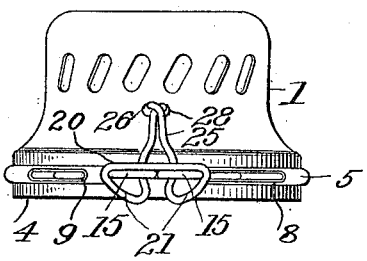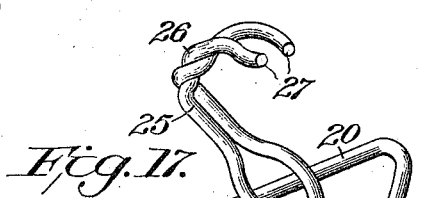

UNITED STATES PATENT OFFICE.

JOHN H. GOSS, OF WATERBURY, CONNECTICUT, AND JOHN WEBER, OF SCHENECTADY, NEW YORK, ASSIGNORS TO WEBER ELECTRIC COMPANY, OF SCHENECTADY, NEW YORK, A CORPORATION OF NEW YORK.

HOLDER FOR GLOBES OF LIGHTING APPARATUS.

984,136.  Specification of Letters Patent.  Patented Feb. 14, 1911.

Application filed October 12, 1910. Serial No. 586,714.

*To all whom it may concern:*

Be it known that we, JOHN H. Goss and JOHN WEBER, citizens of the United States, residing, respectively, at Waterbury, in the county of New Haven and State of Connecticut, and Schenectady, in the county of Schenectady and State of New York, have invented a certain new and useful Improvement in Holders for Globes of Lighting Apparatus, of which the following is a full, clear, and exact description.

The object of this invention is to provide a simple, efficient and economical means for securely holding globes, shades, reflectors and the like in place on electric light fixtures and other lighting apparatus, against accidental release and being jarred out of place, and which means may be readily operated to place and release the globe or other article.

Without thereby limiting the invention or its application, or use, we will describe the invention as applied to an electric light fixture, in which the lamp socket has connected with it a sheet-metal holder, in any suitable way, preferably permanently. This holder has a bottom flange provided with a slotted bead in which is secured a spring clamping ring, whose ends are connected by a cam lever rotatable upon the ends of the ring to expand and contract the ring, respectively to release and to place the globe, or the like; and this clamping lever may be held in place to secure the globe, by active engagement with the holder, all as we will proceed now more particularly to set forth and finally claim.

Figure 5:
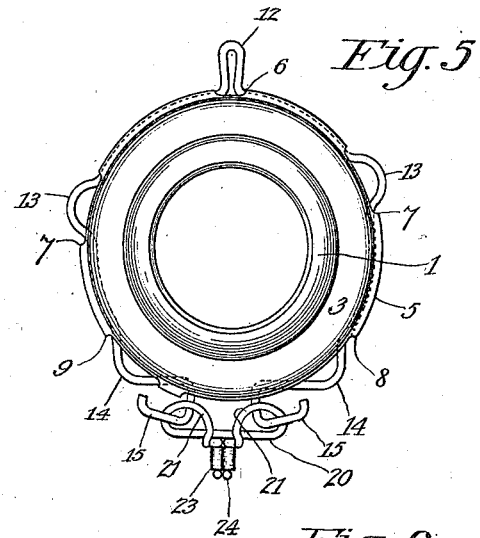
Figure 8:
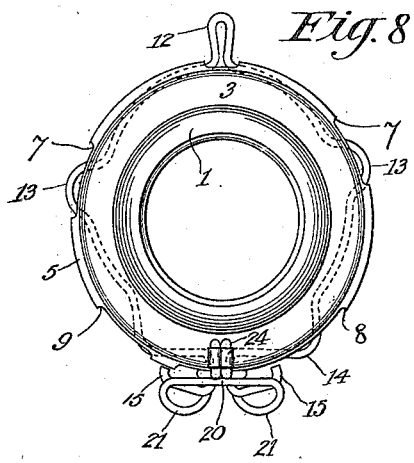
Figure 6:
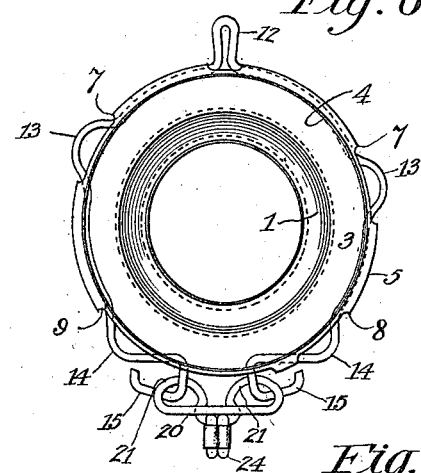
Figure 9:
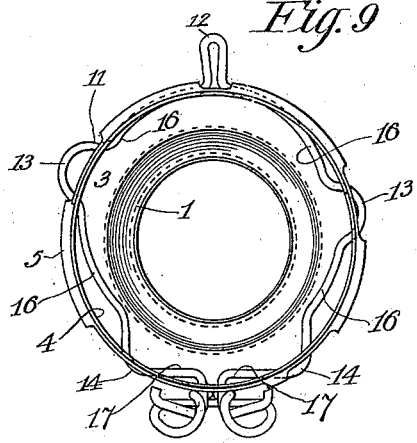
Figure 7:
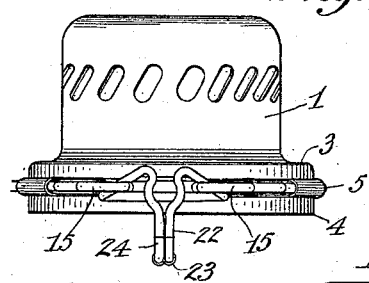
Figure 10:
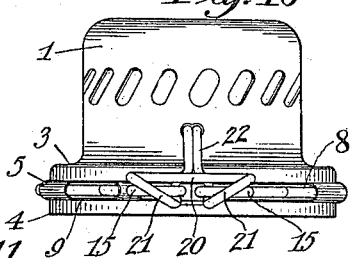
Figure 11:
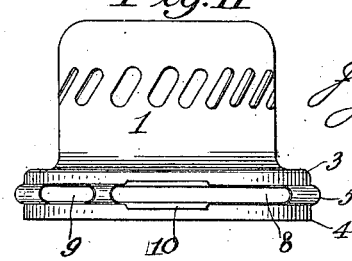

In the accompanying drawings, illustrating the invention, in the several figures of which like parts are similarly designated, Figure 1 is a half section and elevation illustrating the invention in connection with a conventional globe. Fig. 2 is a top plan view, Fig. 3 is a side view, and Fig. 4 is an elevation taken at right angles to the view in Fig. 2, of the cam lever, drawn on an enlarged scale. Fig. 5 is a top plan view of the holder, Fig. 6 is a bottom plan view, and Fig. 7 is a front elevation, showing the ring expanded. Fig. 8 is a top plan view, Fig. 9 is a bottom plan view, and Fig. 10 is a front elevation of the holder, showing the ring contracted. Fig. 11 is a front elevation of the holder without the ring. Figs. 12 and 13 are top plan views of another form of holder wherein the cam lever has an active hold on the holder, the views showing the cam lever disengaged and engaged respectively. Fig. 14 is a side elevation of Fig. 13, with part of the holder broken out. Figs. 15 and 16 are elevations of another form of holder showing respectively the cam lever disengaged and engaged with the holder. Fig. 17 is a perspective view of another form of cam lever, such as shown in Figs. 5 to 16.

The holder 1 is of any suitable construction, and adapted to receive, preferably permanently, in its interior flange 2, any suitable socket or other light fixture, not shown. The base 3 of the holder is enlarged laterally and provided with a depending flange 4, provided with an outwardly extending hollow bead 5. This bead is provided with longitudinal slots 6, 7, 8 and 9, and the slot 8 is flanked by parallel outwardly extending flat embossments 10.

The clamping ring 11 is of irregular outline, and comprises an end projection 12, which is fitted in the slot 6, and side projections 13 which are fitted within the slots 7, and other lateral projections 14 which fit respectively in the slots 8 and 9, and the ends of the ring terminate in loops or eyes 15 separated from one another so that the ring is an open one. The parts 16 of the ring between the several projections, are segments of a circle, while the parts 17 of the ring between the projections 14 and 15, are substantially straight, and these parts 16 and 17 are the active agents for engaging the neck 18 of the globe or other device 19, which is to be attached to the holder, these parts 16 and 17 serving to engage the globe at a number of places. Thus it will be seen that the ring lies substantially in the hollow bead 5, and is supported therein by its projections in such way as to permit freedom of movement in the globe-securing and globe-releasing positions. Moreover, the projections add stiffness to the ring and thereby increase its effectiveness as a spring, in addition to their function of retaining the ring in the holder.

In order to operate the clamping ring to clamp and release the globe, we connect its eyes 15 by means of a cam lever of suitable construction, made of wire or other material, and of a variety of forms, one of which forms is shown in Figs. 1 to 10 inclusive, and more in detail in Figs. 2, 3 and 4, and another shown in Figs. 12 to 17, inclusive. This lever preferably is made of wire, bent to form a substantially straight, horizontal bar 20, whose ends are curved outwardly and convergently to form cam loops 21 which extend away from the bar 20, whence the ends of these loops extend in a reverse direction and are brought together parallelly as shown at 22, and these parallel ends are connected by a sleeve 23 or other connecting device, and the terminals 24 are returned in a direction opposite to the parallel extension 22. The parallel extension 22 and the terminals 24 constitute an operating handle for the lever, and these terminals 24 likewise serve as a stop to arrest the further motion of the clamping lever when in the clamping position, as shown in Figs. 1, 8, 9 and 10; and when in this clamping position, the embossments 10 aid in preventing the cam lever from being jarred out of the holding position. In the other illustrated form of the cam lever shown in Figs. 12 to 17, inclusive, the cam loops may be substantially as just described, and their ends extended to form an operating handle 25, such ends being twisted together, as at 26, or otherwise united, and their terminals 27 bowed and left free so as to be more or less springy.

The holder when of the flat variety shown in Figs. 12, 13 and 14, may have in its top a slot 28, of less length than the greatest width of the bowed ends 27 of the cam lever, so that when said cam lever is rotated in order to draw together the clamping ring, as shown in Figs. 13 and 14, the bowed ends of the handle may be sprung into the slot and thereby the cam lever held against accidental release. Where the cam lever is applied to a holder of the shape shown in Figs. 15 and 16, the slot 28 is made in the side of the holder, but otherwise the action of the cam lever handle with respect thereto is the same as that just described with reference to Figs. 12 to 14.

As already plainly indicated, when the cam lever is made of wire, its ends may be united by twisting, or by sleeves, or any other suitable means.

The embossments 10 may or may not be used, and if used they serve, in addition to the function described, to afford a smooth edge on which the cam lever may slide.

It will be observed that the lever, by virtue of its formation and by virtue of its connection with the eyes in the clamping ring, acts as a cam or a double cam, and its tendency, therefore, when rotated upwardly to the position shown in Figs. 1, 8, 9, 10, 13, 14 and 16 is to draw the ends of the clamping ring together and tighten the ring into holding position about the globe or other article to be retained in the holder, and similarly, when this lever is rotated in the opposite direction, as shown in Figs. 5, 6, 7, 12 and 15, this cam action tends to release the ends of the clamping ring and permit it to spring apart so as to release the globe or other article engaged thereby. The holding action of the cam lever may also be made dependent somewhat upon its taking a position off of center.

As already sufficiently indicated, the two forms of cam levers are interchangeable in the various forms of holders.

While it is advisable in the use of the construction shown in Figs. 12 to 17 to make the operating handle with a spring action end, still it is not necessary. Merely making a tight fit between the end of the handle and the adjacent slot and holder would suffice to retain the handle in engagement with the holder; but the efficiency of the spring action is sufficiently obvious without any further comment.

By the constructions described, a very simple, efficient and economical globe holder is produced, and one susceptible of variations in construction from the details shown.

What we claim is:—

1. The combination with a slotted holder and a globe-clamping ring having end and side projections engaging said slots whereby it is movably supported in said holder, and having terminal loops, of a cam lever applied to said loops and adapted to be rotated therein to open and close the clamping ring with respect to an article in the holder.

2. In combination with a holder, having a longitudinally slotted hollow bead, and a globe-clamping ring provided with end and side projections engaging the slots in said bead, intermediate globe-engaging parts, and terminal loops, of a cam lever engaging said loops and adapted to be rotated therein to expand and contract the clamping ring within the holder.

3. In combination with a globe holder, having a laterally enlarged base flange, and an open-ended spring globe-clamping ring made of wire and bent at intervals to form projections which are sprung into position in said slots, and having intervening globe-engaging parts, of a cam lever connected with the ends of said ring and adapted to expand and contract said ring respectively to release and to place a globe or other article with relation to said holder.

4. The combination with a holder, of globe-clamping mechanism formed of wire having adjacent movable end portions and an intermediate bent portion whereby it is rendered yielding, and a cam lever rotatively applied to said ends of said wire and adapted to hold said ends in definite and fixed relation to each other.

5. The combination with a holder, of a clamping ring movably supported in said holder, and a cam lever applied to the ends of said clamping ring and adapted to be rotated therein to open and close the clamping ring with respect to an article held in the holder, said holder having a slot, and said cam lever having a handle end adapted to engage said slot to hold the said ring and lever in closed position.

6. The combination with a holder, of a clamping ring movably supported in said holder, and a cam lever applied to the ends of said clamping ring and adapted to be rotated therein to open and close the clamping ring with respect to an article held in the holder, the holder having a slot, and the cam lever having a spring action handle adapted to coöperate with the said slot to hold the clamping ring and the cam lever in the closed position.

In testimony whereof we have hereunto set our hands.

JOHN H. GOSS.
JOHN WEBER.

Witnesses as to John H. Goss:
L. H. BASSETT,
G. F. HODGES.

Witnesses as to John Weber:
AUGUST WEBER, Jr.,
BESSIE WILLIAMS.